(12) United States Patent
Schwall et al.

(10) Patent No.: US 10,315,948 B2
(45) Date of Patent: Jun. 11, 2019

(54) PHARMACEUTICAL PACKAGING COMPRISING A CHEMICALLY RESISTANT GLASS

(71) Applicant: SCHOTT AG, Mainz (DE)

(72) Inventors: Michael Schwall, Mainz (DE); Christof Kass, Tirschenreuth (DE); Stephan Tratzky, Neustadt an der Waldnaab (DE); Rainer Eichholz, Frankfurt (DE); Peter Nass, Mainz (DE)

(73) Assignee: SCHOTT AG, Mainz (DE)

( * ) Notice: Subject to any disclaimer, the term of this patent is extended or adjusted under 35 U.S.C. 154(b) by 4 days.

(21) Appl. No.: 15/586,345

(22) Filed: May 4, 2017

(65) Prior Publication Data

US 2017/0320770 A1 Nov. 9, 2017

(30) Foreign Application Priority Data

May 4, 2016 (DE) .................. 10 2016 108 301
Feb. 14, 2017 (DE) .................. 10 2017 102 900

(51) Int. Cl.
*C03C 3/087* (2006.01)
*A61J 1/06* (2006.01)
*B65D 1/02* (2006.01)
*C03C 4/20* (2006.01)
*C03C 3/093* (2006.01)

(52) U.S. Cl.
CPC .............. *C03C 3/087* (2013.01); *A61J 1/062* (2013.01); *A61J 1/065* (2013.01); *B65D 1/0207* (2013.01); *C03C 3/093* (2013.01); *C03C 4/20* (2013.01); *C03C 2204/00* (2013.01)

(58) Field of Classification Search
CPC . C03C 3/087; C03C 3/093; C03C 4/20; A61J 1/062; A61J 1/065; B65D 1/207
See application file for complete search history.

(56) References Cited

U.S. PATENT DOCUMENTS

| 4,012,263 A | 3/1977 | Shell | |
|---|---|---|---|
| 4,302,250 A * | 11/1981 | Danielson | .......... C03C 3/087 501/70 |
| 2010/0006585 A1 * | 1/2010 | Flowers | .......... A61J 7/0409 221/7 |
| 2013/0101596 A1 | 4/2013 | DeMartino | |
| 2013/0237401 A1 * | 9/2013 | Kawaguchi | .......... C03C 3/087 501/66 |
| 2014/0342979 A1 | 11/2014 | Weeks | |
| 2014/0377525 A1 | 12/2014 | Kawaguchi | |
| 2015/0329406 A1 * | 11/2015 | Kawamoto | .......... C03C 3/091 428/34.1 |
| 2016/0107918 A1 * | 4/2016 | Delgado Carranza | .......... C03B 23/04 53/426 |

FOREIGN PATENT DOCUMENTS

| DE | 1816391 | 7/1969 | |
|---|---|---|---|
| EP | 0048120 | 3/1982 | |
| EP | 0510544 | 10/1992 | |
| EP | 2639205 | 9/2013 | |
| EP | 2650262 | 10/2013 | |
| JP | H05155638 | 6/1993 | |
| WO | 2014196655 | 12/2014 | |
| WO | WO-2014191913 A1 * | 12/2014 | .......... C03B 23/04 |

* cited by examiner

*Primary Examiner* — Elizabeth A. Bolden
(74) *Attorney, Agent, or Firm* — Ohlandt, Greeley, Ruggiero & Perle, L.L.P.

(57) ABSTRACT

A pharmaceutical packaging is provided including a glass, comprising at least the following components (given in mol % on oxide basis): $SiO_2$: 5 9-84, $Al_2O_3$: 7-18.5, CaO: 1-25, SrO: 0-6.5, BaO: 0-5, $ZrO_2$: 0-3, $TiO_2$: 0-5, $B_2O_3$: 0-1, wherein the ratio $(CaO+SrO+BaO)/Al_2O_3 < 2.8$, wherein the ratio $(CaO+SrO+BaO)/SiO_2 \leq 0.39$, wherein the hydrolytic resistance according to DIN ISO 720 is class HGA 1, and wherein the glass, apart from unavoidable contaminations, is free of alkali oxides and magnesium oxides.

20 Claims, No Drawings

PHARMACEUTICAL PACKAGING COMPRISING A CHEMICALLY RESISTANT GLASS

CROSS REFERENCES TO RELATED APPLICATIONS

This application claims priority from German patent application 10 2016 108 301.1, filed on May 4, 2016 and from German patent application 10 2017 102 900.1, filed on Feb. 14, 2017. The entire contents of these priority applications are incorporated herein by reference.

BACKGROUND OF THE INVENTION

The invention relates to a pharmaceutical packaging comprising a chemically resistant glass that, in particular, is suitable as primary packaging material in the pharmaceutical industry.

There are high demands with respect to such pharmaceutical packagings. In particular a high chemical resistance is important. In addition the glasses used therefor shall be free of delamination, i.e. during use no layers shall separate from the glass which would contaminate the packaged pharmaceutical agent. A main cause for the delamination is the evaporation of alkali borates or boron or alkali-hydro-oxides during the hot-forming to yield pharmaceutical containers. Basically this can be impeded by using boron-free and alkali-free glasses. However, herein basically a problem resists in the fact that in such a case a substantially increased crystallization tendency results which is also detrimental.

Apart from a very good chemical resistance, however there are further demands with respect to glasses that are suitable as primary packaging material in the pharmaceutical industry.

Thus it should be possible to produce the glasses in common melting units, i.e. the viscosity of the melt must not be too high—if possible, the processing temperature (temperature at which the viscosity is $10^4$ dPas, which is also designated as VA or T4) should not exceed the maximum value of 1350° C. For an energy-saving production T4 should be as low as possible.

From EP 0 510 544 A1 alkali-free glasses with the following composition (in wt.-%) are known: 55-65 $SiO_2$, 10-18 $Al_2O_3$, 0-3 $B_2O_3$, 0-3 MgO, 8-15 CaO, 8-15 SrO and 0-3 ZnO. All examples contain either $B_2O_3$ or MgO.

By using $B_2O_3$ the delamination tendency is increased which is detrimental for a use as a pharmaceutical packaging. The addition of MgO leads to an increased crystallization tendency which is also detrimental.

EP 2 639 205 A1 discloses alkali-free glasses with the following composition (in wt.-%): 58-70 $SiO_2$, 15.5-20 $Al_2O_3$, 0-1 $B_2O_3$, 0-5 MgO, 3.5-16 CaO, 0.5-6.5 SrO and 5-15 BaO. These glasses shall be in particular suitable as display glasses.

Herein the high BaO-content which in all examples is at least 5.9 wt.-%, is detrimental, due to the release of $Ba^{2+}$, which as a heavy metal may give rise to interactions with drugs. In addition the high BaO-content leads to an increased density which increases the cost per kilogram.

From EP 2 650 262 A1 alkali-free glasses with the following composition (in wt.-%) are known: 66-70 $SiO_2$, 12-15 $Al_2O_3$, 0-1.5 $B_2O_3$, more than 9.5 and 13 or less MgO, 4-9 CaO, 0.5-4.5 SrO, 0-1 BaO and 0-2 $ZrO_2$.

The utilization of high portions of MgO in this glass system leads to an increase of the crystallization tendency which during melting in particular during hot-forming leads to problems or impedes the production of pharmaceutical packagings, respectively.

In JP 05155638 A glasses with the following composition (in wt.-%) are described which shall be in particular usable in combination with resins: 54-62 $SiO_2$, 8-12 $Al_2O_3$, 0-5 MgO, 18-22 CaO, 0-5 BaO, 0.5-1.9 $TiO_2$, 0.5-5 ZnO, 0.6-5.0 $ZrO_2$, and 0-1$R_2O$.

In all examples the addition of small amounts of alkali metal oxides ($R_2O$) leads to the formation of easily elusive alkali metal species which also leads to an increase of the delamination tendency. Also MgO is detrimental, since thereby the crystallization tendency is increased. The relatively low $Al_2O_3$ content may lead to low resistances against bases.

In US 2014/0377525 A1 substantially alkali-free glasses with the following composition (in mol %) are disclosed: 60-70 $SiO_2$, 9.5-17 $Al_2O_3$, 0-9 $B_2O_3$, 0-8 MgO, 2-15 CaO, 0.1-10 SrO, 0.5-4 BaO, wherein the molar ratio (CaO+SrO+BaO)/$Al_2O_3$ shall be between 0.6 and 1.0.

According to all examples higher portions of $B_2O_3$ are contained which leads to an increase in the delamination tendency which is detrimental for a use as a pharmaceutical packaging. The additional MgO present in all embodiments of this system also leads to an increased crystallization tendency which is detrimental for the hot-forming.

From WO 2014/196655 A1 glasses for pharmaceutical packagings with low delamination of the following composition (given in mol %) are known: 69-81 $SiO_2$, 4-12 $Al_2O_3$, 0-5 $B_2O_3$, 0-10 MgO+CaO+SrO+BaO, 5-20 $Li_2O$+$Na_2O$+$K_2O$, 0.1-12 $Li_2O$.

The utilization of $B_2O_3$ as well as the relatively high alkali metal oxide content are main causes for increased delamination which is detrimental for a utilization as a pharmaceutical packaging.

From DE 1 816 391 A1 a glass comprising 59 bis 70 mol % $SiO_2$, 10-20 mol % $Al_2O_3$, 12-28 mol % BaO, 0-5 mol % CaO, 0-14 mol % SrO, 0-5 mol % ZnO, 0-3 mol % MgO, 0-2 mol % $B_2O_3$ is known which is utilized as a high-temperature glass.

Herein the high content of BaO is detrimental by the release of $Ba^{2+}$ which as a heavy metal may lead to interactions with drugs. In addition the high contents of BaO lead to an increased density which increases the cost per kilogram.

From U.S. Pat. No. 4,012,263 an alkali-free glass for the electronics industry is known comprising 50-62 wt.-% $SiO_2$, 8-14 wt.-% $Al_2O_3$, 15.5-32 wt.-% BaO and at least CaO or MgO, wherein CaO is 0-25 wt.-% and MgO is 0-2.4 wt.-%.

Again the high BaO-content is detrimental.

In addition from EP 0 048 120 A1 a high-temperature-glass for tungsten halogen lamps is known that comprises 64-68 wt.-% $SiO_2$, 11-14 wt.-% CaO, 16.5 to 18.5 wt.-% $Al_2O_3$ and a total amount of SrO and BaO of 2-6.5 wt.-%, wherein SrO is 0-4 wt.-% and BaO is 0-5 wt.-%.

SUMMARY OF THE INVENTION

It is a first object of the invention to disclose a pharmaceutical packaging comprising a glass having a sufficient chemical resistance so that it is suitable as a pharmaceutical packaging.

It is a second object of the invention to disclose a pharmaceutical packaging comprising a glass having a sufficient chemical resistance and which can be produced in common melting installations at melting temperatures that are not too high.

These and other objects according to one aspect of the invention are solved by a pharmaceutical packaging with a glass, comprising at least the following components (given in mol % on oxide basis):

| | |
|---|---|
| $SiO_2$ | 59-84 |
| $Al_2O_3$ | 7-18.5 |
| CaO | 1-25 |
| SrO | 0-6.5 |
| BaO | 0-5 |
| $ZrO_2$ | 0-3 |
| $TiO_2$ | 0-5 |
| $B_2O_3$ | 0-1 | wherein the ratio $(CaO+SrO+BaO)/Al_2O_3 < 2.8$;
wherein the ratio $(CaO+SrO+BaO)/SiO_2 \leq 0.39$;
wherein the hydrolytical resistance according to DIN ISO 720 is class HGA 1;
and wherein the glass, apart from unavoidable contaminations, is free of alkali oxides and of magnesium oxide.

As far as within this application compositions are given in the form that particular components are present therein or that they comprise particular components, these are always to be understood so that any additional components may be contained therein (open composition).

In a further configuration of the invention the given compositions, however, are also to be understood so that the respective components given are contained therein (closed composition), apart from unavoidable contaminations that are due to the nature of the glass manufacture. Depending on the purity of the raw materials that are used, such unavoidable contaminations are limited to a maximum of 1 mol %, preferably 0.5 mol %, further preferred to 0.1 mol %, or even to 0.05 wt. mol %.

As far as in this application compositions are given in the form that they consist of particular components, then these compositions are always to be understood that only the given components are contained therein (closed composition), however with the proviso that unavoidable contaminations that are due to the nature of the glass manufacture, may be contained therein. Depending on the purity of the used raw materials, such unavoidable contaminations are limited to a maximum of 1 mol %, preferably of 0.5 mol %, more preferred to 0.1 mol %, or even of 0.05 mol %.

As far as within this application compositions are given in examples by listing particular components, these statements are to be understood as closed compositions, however with the proviso that unavoidable contaminations that are due to the nature of the glass manufacture, may be contained therein. Depending on the purity of the used raw materials such unavoidable contaminations are limited to a maximum of 1 mol %, preferably of 0.5 mol %, more preferred to 0.1 mol %, or even of 0.05 mol %.

With the pharmaceutical packaging according to the invention the delamination tendency is considerably reduced due to the absence of alkali oxides and only low portions of boron oxide, which is particularly advantageous for an application as pharmaceutical packaging. Due to the absence of magnesium oxide an improved hydrolytic resistance is made possible. In addition an increased crystallization tendency is avoided which would lead to problems during hot-forming.

The low content of boron oxide leads to a low delamination tendency. Small additions of $B_2O_3$ of at least 0.05 mol %, or at least 0.1 mol %, up to about 1.0 mol %, preferably up to 0.5 mol % can improve the meltability, can lower the crystallization tendency and can positively influence the chemical resistance. Also the resistance at high temperature is positively influenced.

The hydrolytic resistance according to DIN ISO 720:1985 of the glasses according to the invention is in the class HGA 1. In addition the viscosity of the glasses according to the invention allows for a processing in common melting pots, since the processing temperature T4 is maximum of 1350° C.

A minimum content of 59 mol % $SiO_2$ is responsible for a good chemical resistance. Starting with a $SiO_2$-content of more than 84 mol % the processing temperature T4 increases too much so that a melting in common melting installations is no longer possible. A $SiO_2$-content of 60 to 70 mol % has been found to be particularly advantageous to ensure a good chemical resistance on the one hand and to limit the processing temperature T4 on the other hand.

In addition the ratio of $(CaO+SrO+BaO)/SiO_2$ is selected to be smaller or equal to 0.39 so that one $Ca^{2+}$, $Sr^{2+}$ or $Ba^{2+}$ ion per two $[SiO_4]$-units is present at most within the glass structure, so that the $M^{2+}$-ions are bound stronger within the network. Particularly good results are obtained with a ratio of $(CaO+SrO+BaO)/SiO_2$ which is larger than 0.25.

The minimum content of $Al_2O_3$ von 7 mol % is selected so that the glass structure is assisted and an excellent hydrolytic resistance is reached. In addition additions of $Al_2O_3$ improve in particular the chemical resistance in the pH-range of 6-14. In particular the low chemical resistance of purely silicatic glasses in the pH-range of 8-14 is highly improved. The maximum portion of $Al_2O_3$ is selected so that the processing temperature and thus the production cost do not increase too much, and so that the crystallization tendency is not increased.

Particular advantageous results are reached when the $Al_2O_3$-content is in the range of 9 to 12 mol %.

In addition the ratio $(CaO+SrO+BaO)/Al_2O_3$ is selected to be smaller than 2.8 so that at least one $[AlO_4]$-group is present per three $M^{2+}$-ions, whereby the mobility of the $M^{2+}$-species is decreased and an excellent hydrolytic resistance is made possible. Particularly good results are obtained with a ratio of $(CaO+SrO+BaO)/Al_2O_3$ that is smaller than 2.3 and larger than 1.9.

In addition the glasses may contain 0 to 3 mol % of $ZrO_2$. Thereby the hydrolytic resistance at slightly increased pH-values (8-9) is stabilized without that the processing temperature is increased beyond 1350° C.

The glasses according to the invention in addition may contain 0 to 4.5 mol % of $TiO_2$.

$TiO_2$ may also take over the function of $ZrO_2$ and may assist in the stabilization of the glass structure in that glass structural units of $[TiO_3]^{2-}$ and $Ca^{2+}$ are formed which decrease the mobility of the $Ca^{2+}$-ions and thus also the leaching tendency. The limit of a maximum of 5 mol % is selected so that on the one hand the processing temperature does not increase beyond 1350° C., and on the other hand the deglassing tendency is not increased.

A particularly good chemical resistance results, when the total content $TiO_2+ZrO_2$ is a minimum of 0.5 mol %, preferably of 0.8 mol %.

The total content of $TiO_2+ZrO_2$ in addition is preferably a maximum of 6 mol %, preferably a maximum of 4 mol %, further preferred a maximum of 3 mol %, particularly preferred a maximum of 2.5 mol %, since otherwise the crystallization tendency and the processing temperature are increased too much.

Preferably the glasses according to the invention are free of zinc oxide, apart from unavoidable contaminations, since this is not desired for pharmaceutical applications.

In addition, SrO may be introduced into the glass to keep the processing temperature below 1350° C. by means of disorder. In addition the low mobility leads to an improved leaching behavior. Preferably the content of SrO is smaller than 4 mol %, particularly preferred smaller than 3 mol %.

In addition, also BaO can be introduced into the glass to maintain the processing temperature below 1350° C. by means of disorder. The mobility of BaO is even smaller.

An addition of lead oxide PbO preferably is dispensed with, due to toxilogical reasons.

Even when on a laboratory scale without an addition of refining agents bubble-free and streak-free glasses are obtained, the glasses according to the invention may contain 0.01 to 2 mol %, preferably 0.1 to 1.5 mol %, of refining agents for a large-scale production.

By the addition of fluorine the viscosity of the melt is lowered which accelerates the refining process. Due to environmental reasons an addition of $As_2O_3$ or $Sb_2O_3$ should be dispensed with.

By the addition of chlorides or fluorides as refining agents the acid-resistance of glass tends to be impaired. In addition an addition of chlorides may lead to the effect that during each heating chloride evaporates and subsequently condensates on the glass products. An addition of fluorides on the one hand leads to a decrease of the processing temperature T4, however on the other hand the chemical resistance is slightly impaired. Also additions of chloride may lead to chloride evaporation and condensation tendencies. Finally the tray resistance may be impaired by additions of fluoride.

Due to these reasons the additions of chloride and fluoride as refining agents are limited to a maximum of 1.5 mol % of chloride, or fluoride, respectively.

The pharmaceutical packagings in particular are suitable as primary packaging material within the pharmaceutical industry, in particular as bottles, syringes, carpules or ampoules.

The pharmaceutical packagings according to the invention are in particular suitable for producing glass containers which are particularly suitable for the storage of pharmaceutical agents, since in contact with active components and buffering systems they are chemically inert.

They are in particular suitable for receiving active components and/or buffering solutions within a pH-range of 1-11, as well as in the pH-range of 5-7.

In addition they are particularly suitable for receiving water for injection purposes.

It will be understood that the afore-mentioned features and the features to be explained hereinafter cannot only be used in the respectively given combination, but also in different combinations or independently, without leaving the scope of the invention.

DESCRIPTION OF PREFERRED EMBODIMENTS

EXAMPLES

In Table 1 glasses for the pharmaceutical packagings according to the invention are summarized together with their most important characteristics.

The glasses were molten by melting common raw materials within an inductively heated Pt/Rh (Pt20Rh) melting pot at 1650° C. The melting time was three to four hours. Subsequently the melt was homogenized for one hour at 1600° C. by stirring and was thereafter relieved at this temperature without stirring, giving rise to an ascending of bubbles to the surface. The melt was cooled with a defined cooling rate of 30 K/h.

All these glasses show a good hydrolytic resistance and a processing temperature T4 below 1350° C., partially substantially below that.

Comparative examples not belonging to the invention are summarized in Table 2.

TABLE 1

Examples (compositions in mol %)

| | Examples | | | | | | | | | | |
|---|---|---|---|---|---|---|---|---|---|---|---|
| | B1 | B2 | B3 | B4 | B5 | B6 | B7 | B8 | B9 | B10 | B11 |
| $SiO_2$ | 62.6 | 67.1 | 68.4 | 67.1 | 66.8 | 66.7 | 73.3 | 72.4 | 67.5 | 68.7 | 68.5 |
| $Al_2O_3$ | 11.0 | 10.3 | 11.3 | 10.3 | 10.3 | 9.7 | 11.9 | 11.6 | 10.4 | 10.6 | 10.9 |
| MgO | 0.0 | 0.0 | 0.0 | 0.0 | 0.0 | 0.0 | 0.0 | 0.0 | 0.0 | 0.0 | 0.0 |
| CaO | 24.4 | 19.9 | 16.0 | 18.8 | 19.8 | 20.7 | 11.9 | 12.7 | 20.0 | 17.4 | 16.3 |
| SrO | 0.0 | 1.6 | 2.2 | 2.2 | 1.9 | 1.9 | 2.0 | 1.0 | 0.0 | 0.0 | 0.0 |
| BaO | 0.0 | 0.0 | 0.0 | 0.0 | 0.0 | 0.0 | 0.0 | 1.5 | 1.1 | 2.2 | 3.5 |
| $TiO_2$ | 0.0 | 0.0 | 0.0 | 1.6 | 1.2 | 0.4 | 0.4 | 0.0 | 0.0 | 0.0 | 0.0 |
| $ZrO_2$ | 2.0 | 1.1 | 2.0 | 0.0 | 0.0 | 0.5 | 0.5 | 0.8 | 1.1 | 1.1 | 0.5 |
| $B_2O_3$ | 0.0 | 0.0 | 0.0 | 0.0 | 0.0 | 0.0 | 0.0 | 0.0 | 0.0 | 0.0 | 0.3 |
| Sum | 100.0 | 100.0 | 100.0 | 100.0 | 100.0 | 100.0 | 100.0 | 100.0 | 100.0 | 100.0 | 100.0 |
| (CaO + SrO + BaO)/$Al_2O_3$ | 2.2 | 2.1 | 1.6 | 2.0 | 2.1 | 2.3 | 1.2 | 1.2 | 1.9 | 1.6 | 1.8 |
| (CaO + SrO + BaO)/$SiO_2$ | 0.39 | 0.32 | 0.27 | 0.31 | 0.32 | 0.34 | 0.19 | 0.19 | 0.30 | 0.25 | 0.29 |
| CTE [ppm/K] | 5.15 | 4.84 | 4.49 | 4.87 | 4.87 | 5.03 | 3.82 | 4.02 | 4.82 | 4.61 | 4.7 |
| Tg [° C.] | 800 | 803 | 817 | 784 | 783 | 786 | 810 | 824 | 807 | 772 | 790 |
| Density [g/cm$^3$] | 2.67 | 2.63 | 2.63 | 2.61 | 2.61 | 2.61 | 2.63 | 2.52 | 2.57 | 2.63 | 2.64 | 2.67 |
| T13 [° C.] | 802 | 801 | 820 | 784 | 785 | 789 | 844 | 835 | 802 | 776 | 795 |
| T7,6 [° C.] | 965 | 989 | 1015 | 972 | 968 | 968 | 1065 | 1054 | 989 | 984 | 1005 |
| T4 [° C.] | 1222 | 1274 | 1311 | 1257 | 1254 | 1250 | 1401 | 1386 | 1276 | 1290 | 1305 |
| ISO 720 [µg $Na_2O$/g] | 45.9 | 36.5 | 29.1 | 35.7 | 39.2 | 43.3 | 37.7 | 21.6 | 41.8 | 32.4 | 30.0 |
| Class ISO 720 | 1 | 1 | 1 | 1 | 1 | 1 | 1 | 1 | 1 | 1 | 1 |

In Table 2 the examples V1-V3 do not fulfill the second boundary condition (CaO+SrO+BaO)/SiO$_2$≤0.39, whereby also a hydrolytic resistance according to ISO 720 of the class 2 can be reached at most.

The pharmaceutical packagings according to the invention are in particular suitable for making pharmaceutical containers which in contact with active agents and buffering systems are chemically inert in the pH-range of 1-11 and thus are excellently suitable for storing these materials.

TABLE 2

Comparative examples (compositions in mol %)

| | Comparative examples | | | |
|---|---|---|---|---|
| | V1 | V2 | V3 | V4 |
| SiO$_2$ | 59.1 | 61.0 | 60.7 | 56.0 |
| Al$_2$O$_3$ | 9.0 | 8.5 | 7.6 | 16.0 |
| MgO | 5.0 | 5.0 | 5.1 | 9.0 |
| CaO | 25.9 | 24.5 | 25.6 | 18.0 |
| SrO | 0.0 | 0.0 | 0.0 | 0.0 |
| BaO | 0.0 | 0.0 | 0.0 | 0.0 |
| TiO$_2$ | 0.0 | 0.0 | 0.0 | 0.0 |
| ZrO$_2$ | 1.0 | 1.0 | 1.0 | 1.0 |
| Sum | 100.0 | 100.0 | 100.0 | 100.0 |
| (CaO + SrO + BaO)/Al$_2$O$_3$ | 2.9 | 2.9 | 3.4 | 1.1 |
| (CaO + SrO + BaO))/SiO$_2$ | 0.44 | 0.40 | 0.42 | 0.32 |
| CTE [ppm/K] | 5.54 | 5.5 | 5.54 | 4.7 |
| Tg [° C.] | 760 | 764 | 759 | 788 |
| Density [g/cm3] | 2.64 | 2.67 | 2.68 | 2.66 |
| T13 [° C.] | 766 | 765 | 762 | 788 |
| T7.6 [° C.] | 931 | 933 | 927 | 953 |
| T4 [° C.] | 1174 | 1184 | 1175 | 1203 |
| ISO 720 [µg Na$_2$O/g] | 66.4 | 63.2 | 69.6 | 62.5 |
| Class ISO 720 | 2 | 2 | 2 | 2 |

In particular the pharmaceutical containers made of the glass compositions according to the invention are suitable for the storage of active agents and buffering agents within the pH-range of 4-9 (e.g. 1 Mol of sodium dicarbonate solution NaHCO3, or 8.4%, respectively, with a pH-value of about 8).

In particular pharmaceutical containers which are made of the glasses according to the invention are suitable for the storage of active agents, buffering solutions in the pH-range of 5-7 (e.g. (1) 10 mmol citrate-buffering, pH=6.0 with 150 mmol NaCl and 0.005% Tween 20, or (2) 10 mmol phosphate-buffering, pH=7.0 with 150 mmol NaCl and 0.005% Tween 20), as well as for the storage of water for injection purposes (e.g. Sartorius ultra-pure water, rinsed through 0.2 µm-filter and having a resistance of 18.2 MΩ·cm).

What is claimed is:

1. A pharmaceutical packaging comprising:
   a container made of a glass, said glass comprising at least the following components (given in mol % on oxide basis):

| | |
|---|---|
| SiO$_2$ | 59-84 |
| Al$_2$O$_3$ | 7-18.5 |
| CaO | 1-25 |
| SrO | 0-6.5 |
| BaO | 0-5 |
| ZrO$_2$ | 0.5-3 |
| TiO$_2$ | 0-5 |
| B$_2$O$_3$ | 0-1, | wherein said glass comprise a ratio (CaO+SrO+BaO)/Al$_2$O$_3$<2.8;

wherein said glass comprises a ratio (CaO+SrO+BaO)/SiO$_2$≤0.39;

wherein said glass comprises a hydrolytic resistance according to DIN ISO 720 that is class HGA 1; and wherein said glass, apart from unavoidable contaminations, is free of alkali oxides and of magnesium oxide.

2. The pharmaceutical packaging of claim 1, wherein the ratio (CaO+SrO+BaO)/Al$_2$O$_3$ is smaller than 2.3.

3. The pharmaceutical packaging of claim 1, wherein the ratio (CaO+SrO+BaO)/Al$_2$O$_3$ is larger than 1.9.

4. The pharmaceutical packaging of claim 1, wherein the ratio (CaO+SrO+BaO)/SiO$_2$>0.25.

5. The pharmaceutical packaging of claim 1, wherein the content of BaO≤3.

6. The pharmaceutical packaging of claim 1, wherein the content of Al$_2$O$_3$ is smaller than 12 mol %.

7. The pharmaceutical packaging of claim 1, wherein the content of Al$_2$O$_3$ is larger than 9 mol %.

8. The pharmaceutical packaging of claim 1, wherein the content of CaO is larger than 15 mol %.

9. The pharmaceutical packaging of claim 1, wherein the content of SrO is smaller than 4 mol %.

10. The pharmaceutical packaging of claim 1, wherein said glass comprises a total content of TiO$_2$+ZrO$_2$ that is at least 0.8 mol %.

11. The pharmaceutical packaging of claim 1, wherein said glass comprises a total content of TiO$_2$+ZrO$_2$ that is 6 mol % at most.

12. The pharmaceutical packaging of claim 1, wherein the content of SiO$_2$ is larger than 60 mol %.

13. The pharmaceutical packaging of claim 1, wherein the content of SiO$_2$ is smaller than 70 mol %.

14. The pharmaceutical packaging of claim 1, wherein the content of:
    B$_2$O$_3$ is 0.1-1.

15. The pharmaceutical packaging of claim 1, wherein said glass has a maximum processing temperature T4 of 1350° C.

16. The pharmaceutical packaging of claim 1, wherein said glass has a weight loss according to DIN ISO 720 that is smaller than 50 µg Na$_2$O/g.

17. The pharmaceutical packaging of claim 1, wherein said glass further comprises 0.01 to 2 mol % of refining agents.

18. The pharmaceutical packaging of claim 1, wherein said glass comprises a content of As$_2$O$_3$, Sb$_2$O$_3$, Cl—, F— and SO$_4^{2-}$ that is a maximum of 1.5 mol % each, and wherein the content of SnO$_2$ and CeO$_2$ is a maximum of 1 mol % each.

19. The pharmaceutical packaging of claim 1, wherein said container is at least one container selected from the group consisting of: a bottle, a syringe, a carpule, and an ampoule.

20. A pharmaceutical packaging, comprising a container made of glass and, within said container and in direct contact with said glass, at least one selected from a group consisting of: an active pharmaceutical agent, a buffering solution within a pH-range of 1-11, and water for injection, said glass comprising at least the following components (given in mol % on oxide basis):

| | |
|---|---|
| SiO$_2$ | 59-84 |
| Al$_2$O$_3$ | 7-18.5 |
| CaO | 1-25 |
| SrO | 0-6.5 |
| BaO | 0-5 |

-continued

| | |
|---|---|
| $ZrO_2$ | 0-3 |
| $TiO_2$ | 0-5 |
| $B_2O_3$ | 0-1, | wherein said glass comprises a ratio $(CaO+SrO+BaO)/Al_2O_3<2.8$;
wherein said glass comprises a ratio $(CaO+SrO+BaO)/SiO_2 \leq 0.39$;
wherein said glass comprises a hydrolytic resistance according to DIN ISO 720 that is class HGA 1; and
wherein said glass, apart from unavoidable contaminations, is free of alkali oxides and of magnesium oxide.

* * * * *